May 29, 1928.
A. F. DEUEL
1,671,704
STABILIZER
Filed Dec. 9, 1925
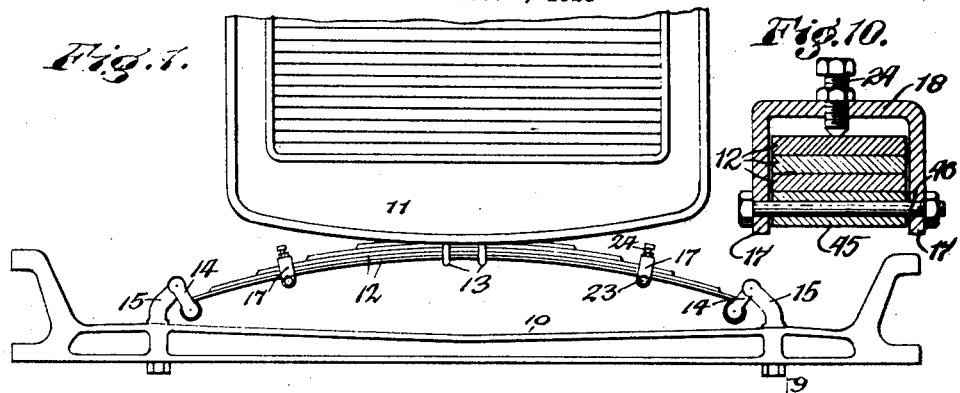

Patented May 29, 1928.

1,671,704

UNITED STATES PATENT OFFICE.

ALBERT FRANKLYN DEUEL, OF BUFFALO, NEW YORK, ASSIGNOR TO WILLIAM F. EMERSON, OF BUFFALO, NEW YORK.

STABILIZER.

Application filed December 9, 1925. Serial No. 74,230.

This invention relates to a stabilizer for automobiles in which the suspension of the body or frame on the axles is effected by means of laminated or leaf springs.

In automobiles having such spring mountings as heretofore organized the leaves of the spring engaged each other loosely at their free ends and during heavy rebound actions the same become separated and the whole load is placed on the main leaf, thereby not only offering a minimum resistance to the rebound but also frequently breaking the main leaf.

In springs of this character the superposed leaves are usually curved or of arch form while in a normal position and when the automobile of which they form a part runs over uneven roads these leaves are alternately moved by vertically pressure into a more or less straightened position and then returned to the normal curved condition, thereby causing the several leaves to creep or slide lengthwise on each other during this action.

It is the purpose of this invention to provide a stabilizer for automobiles having such leaf spring mountings which is so organized that several leaves of the springs are firmly held in engagement with each other at all times so as to set up a constant frictional engagement between the free parts of the several leaves which resists the movement of the several leaves one upon the other and thus checks any sudden action of the springs and particularly cushions the rebound of the same so that no harmful effects are produced.

In its general organization this stabilizer comprises a U-shaped clip which is adapted to straddle a plurality of leaves of the spring, a seat connecting the legs of the clip and engaging one side of the group of spring leaves, and pressure creating and retaining means mounted on the cross bar of the clip and adapted to engage the opposite side of the respective group of spring leaves.

In the accompanying drawings:

Figure 1 is a fragmentary front elevation of an automobile having leaf springs between the body and axle equipped with my improved stabilizer.

Figure 2 is a fragmentary front elevation, on an enlarged scale, of a leaf spring connected with an axle and provided with one form of stabilizer embodying my invention.

Figure 3 is a cross section, on an enlarged scale, taken on line 3—3 Fig. 2.

Figure 4 is a perspective view of the cover of the lubricating means shown in Fig. 3.

Figure 5 is a similar view of an absorbent pad forming part of the lubricating means shown in Fig. 3.

Figure 6 is a similar view of the pan forming part of the lubricating means shown in Fig. 3.

Figure 7 is a cross section similar to Fig. 3 showing a modified form of my invention.

Figure 8 is a cross section, similar to Figs. 3 and 7, showing another modification of my improvements.

Figure 9 is a fragmentary vertical longitudinal section taken on line 9—9 Fig. 8.

Figure 10 is a cross section of another modification.

Like reference characters indicate similar parts in the several figures of the drawings.

This invention is applicable to various forms of spring suspension in automobiles and the installations shown in the drawings is therefore to be taken as merely an example of a well known type of car having its spring system equipped with the present invention.

Referring to Figs. 1 and 2, the numeral 10 represents an axle of the running gear, and 11 the front part of the body. Between the axle and body is arranged a laminated leaf spring which forms a part of the spring suspension and which in the present instance consists of a semielliptical leaf spring composed of a plurality of spring leaves 12 which are superposed and of progressively greater length from the shortest to the longest or main spring. The central parts of these spring leaves are connected with each other and with the body by a fastening 13 and the extremities of the main spring leaf are connected by vertically swinging shackles 14 with the standards 15 on the axle, whereby the free parts of the spring leaves between the central fastening and the shackles are caused to slide lengthwise up on each other as the spring is deflected by a load from its curved position into a more or less straightened position and then recoils or rebounds from such straightened position to or beyond its normal curved position, in a well known and usual manner.

During compression the deflection of the spring is distributed over the several leaves but during rebound only the main spring leaf resists such motion because its ends are fixed and remaining leaves are either separated from each other or only bear lightly against one another so that no frictional resistance is present which would tend to check rebound of the spring.

Stabilizing means are therefore provided which embody my invention and which are applicable to the laminated spring whereby the several leaves thereof are constantly clamped together and thus caused to engage each other frictionally while sliding lengthwise up on each other during compression but also during rebound or recoil and thus operate to absorb shock and stabilize the operations of the car.

The particular embodiment of this invention, as shown in Figs. 1–6, is constructed as follows:

The main frame of this stabilizer is constructed in the form of a U-shaped clip the legs 17, 17 of which extend past the opposite edges of the spring leaves and the cross bar 18 which connect two corresponding ends of said legs extends across one side of the group of leaves forming said spring.

The opposite side of the group of spring leaves bear against a seat which is carried by the opposite ends of the legs of the frame clip and which in this instance consists of a roller 19 arranged transversely with the adjacent side of the leaves and engages therewith and is pivotally mounted on the ends of said clip legs so as to be capable of rotation thereon. This pivotal mounting is preferably effected means of two trunnion screws each of which has an externally threaded inner shank 20 engaging with an internal thread at one end of the roller, an enlarged intermediate cylindrical neck 21 turning in a bearing opening 22 in one leg of the frame clip, and an outer head 23 engaging with the outer side of said leg.

Each of the necks 21 is slightly longer than the thickness of the respective leg through which it passes so that this screw can be tightened on the roller and form a pivot or trunnion therefor without binding on the leg in which it turns.

This roller seat is firmly held down against the respective side of the group of spring leaves by a clamping screw 24 working in a threaded opening in the cross bar 18 engaging its inner end with the opposite side of the group of spring leaves. The inner end of this screw is preferably so constructed that the same is prevented from slipping on the outermost leaf of the group, this being accomplished in the present instance by providing the inner end of this screw with a sharp cup shaped edge 25 as best shown in Fig. 3, whereby this screw upon being tightened digs into the surface of the respective outer leaf and anchors the frame clip in place. After the clamping screw has been tightened sufficiently to obtain the required degree of pressure between the several superposed spring leaves the same is held in place by a jamb nut 27 applied to the shank thereof and engaging with the outer side of the cross bar 18.

As the spring is compressed when subjected to a load, such a shock produced when the automobile passes over an uneven road, the curvature of the spring leaves is reduced which causes the several leaves to slide lengthwise on each other and such sliding action of the several spring leaves on each other also occurs when the spring retracts and the curvature of its leaves is again increased. Due to the constant pressure which is exerted by the stabilizer against opposite sides of the spring the leaves thereof are pressed together and caused to frictionally engage each other at all times so that the longitudinally sliding motion of the leaves upon each other is frictionally resisted. This frictional resistance is particularly advantageous during rebound of the spring inasmuch as it serves to check or absorb this rebound or recoil and thus avoid transmitting the shock to the body of the car and its load.

During the sliding motion of the leaves upon each other the roller 19 is free to turn the requisite extent under the creeping effect of the spring leaf engaging therewith, thereby preventing the latter from buckling while in operation.

By tightening the clamping screw more or less the degree of frictional resistance which is obtained between the spring leaves may be varied for adapting the shock absorbing capacity of the stabilizer to the load which is carried and the weight of the car to which the same is applied.

In addition to absorbing shock during rebound of the car the stabilizer checks side swaying of the car and therefore reduces the rocking effect on the car and renders riding in the car more agreeable.

A lubricator is preferable combined with the stabilizer whereby the cooperating surfaces of the spring leaves will be constantly lubricated so that the same will not squeak and also slide freely on each other without producing undue wear. The form of lubricator for this purpose shown in Figs. 2, 3, 4, 5 and 6 is constructed as follows:

The numeral 28 represents a pan of sheet metal resting with its bottom on that side of the spring leaves opposite the cross bar 18 of the frame clip and provided in said bottom with a large central hole 29 and plurality of small holes or perforations 30. The central hole 29 receives the clamping screw whereby the latter serves to hold the pan in place. Within the pan is arranged an absorbent pad 31 of felt or the like which is adapted to be saturated with lubricating oil which latter seeps slowly through the perforations in the bottom of the pan and then flows downwardly along the opposite edges of the spring leaves and creeps in between these leaves so that the cooperating surfaces are effectively lubricated and prevented from squeaking, wearing and rusting. This pad is provided with a central opening 32 which receives the clamping screw and is held in place thereby. In order to keep dust and dirt from the pad its outer side is protected by a cover 33 which rests on the pad and provided with a central opening 34 through which the clamping screw extends so that the latter serves to hold the cover in place. For replenishing the pad with oil the spout 35 of an oil can is passed through an opening 36 in the cross bar and pushed down against the cover so that the latter is compressed and thus forms a pocket into which the oil can flow from the supply spout and then pass into the pad.

In the construction shown in Fig. 7 the pivotally mounted roller 19 is replaced by a bolt the shank 37 of which passes through coinciding openings 22 in the clip legs and bears against the adjacent side of the group of spring leaves. The head 39 and nut 40 of this bolt engage with the outer side of said legs. The lubrication of the spring leaves in this construction is effected by means of an absorbent pad similar to that shown in Fig. 3 which rests directly on the top of the leaf spring instead of being enclosed by a pan and the same is also provided with a central opening which receives the clamping screw.

If desired the seat for that side of the spring leaves next to the ends of the legs of the frame clip may be constructed in the form of a U-shaped saddle the cross bar 41 of which engages with the adjacent side of the spring leaves while its legs 42 at opposite ends of said bar are arranged on the inner side of the clip legs, as shown in Figs. 8 and 9. The clip frame and the U-shaped seat or saddle are coupled by a horizontal bolt 43 passing transversely through corresponding openings in the legs of the clip and the saddle.

In this last mentioned construction the clamping screw is provided with a conical point 44 for engagement with the adjacent side of the spring leaves to hold the stabilizer against displacement.

If desired the seat may be formed by a tubular roller 45 arranged between the free end of the legs of the clip and engaging with the adjacent side of the leaf spring, and a bolt 46 passing through said roller and said legs for holding the same in operative relation, as shown in Fig. 10.

All of the several forms of my invention operate to hold the plurality of leaves of a multiple leaf or laminated spring in firm contact with each other so that the frictional resistance produced thereby operates effectively to stabilize the movement of the axle and body of an automobile toward and from each other and also controls side swaying of the body relatively to the axle.

It will be noted that in each of the several constructions shown in the drawings and described in the foregoing specification the pressure device is transversed in line with the seat, thereby preventing the clip or frame from tilting in a direction lengthwise of the spring leaves and maintaining a uniform bearing of the seat and pressure device against the spring leaves at all times regardless of whether the same are fully retracted or whether same are deflected under an increased load.

I claim as my invention:

1. A stabilizer for laminated leaf springs comprising a clip having legs adapted to be arranged adjacent to opposite edges of the spring leaves and a cross bar connecting one end of said legs and extending across one side of said leaves, a seat mounted on the ends of said legs and adapted to engage with the other side of said leaves and consisting of a roller engaging the adjacent side of the spring leaves, and screws engaging with opposite ends of said roller and journaled in bearings on the legs of said clip and a pressure device mounted on said cross bar and adapted to engage with the adjacent side of said leaves.

2. A stabilizer for laminated leaf springs comprising a clip having legs adapted to be arranged adjacent to opposite edges of the spring leaves and a cross bar connecting one end of said legs and extending across one side of said leaves, a seat mounted on the ends of said legs and adapted to engage with the other side of said leaves, a clamping screw arranged on said cross bar and adapted to bear against the adjacent side of the spring leaves and an absorbent pad adapted to receive a lubricant and to be arranged adjacent to said cross bar and provided with an opening which receives said clamping screw.

3. A stabilizer for laminated leaf springs comprising a clip having legs adapted to be arranged adjacent to opposite edges of the spring leaves and a cross bar connecting one end of said legs and extending across one side of said leaves, a seat mounted on the ends of said legs and adapted to engage with the other side of said leaves, a clamping screw arranged in said cross bar and adapted to bear against the adjacent side of the spring leaves and means for lubricating said spring leaves consisting of a perforated pan adapted to be arranged between said cross bar and the adjacent side of the spring leaves and provided with an opening for the passage of said clamping screw, an absorbent pad adapted to retain the lubricant arranged in said pan and provided with an opening for the reception of said clamping screw, and a cover resting on said pan and provided with an opening for the passage of said clamping screw.

ALBERT FRANKLYN DEUEL.